(12) United States Patent
Geldman (10) Patent No.: US 9,400,205 B2
(45) Date of Patent: Jul. 26, 2016

(54) HANGING SCALE HAVING A DEFLECTION MEASUREMENT SECTION ARRANGED TRANSVERSELY TO A VERTICAL AXIS

(71) Applicant: Vishay Advanced Technologies, Ltd., Holon (IL)

(72) Inventor: Chaim Geldman, Ramat Gan (IL)

(73) Assignee: Vishay Advanced Technologies, Ltd., Holon (IL)

( * ) Notice: Subject to any disclaimer, the term of this patent is extended or adjusted under 35 U.S.C. 154(b) by 99 days.

(21) Appl. No.: 14/505,822

(22) Filed: Oct. 3, 2014

(65) Prior Publication Data

US 2015/0096812 A1   Apr. 9, 2015

(30) Foreign Application Priority Data

Oct. 4, 2013  (EP) ..................................... 13187405

(51) Int. Cl.
| | |
|---|---|
| *G01G 3/08* | (2006.01) |
| *G01G 3/14* | (2006.01) |
| *G01G 19/18* | (2006.01) |
| *G01L 1/22* | (2006.01) |

(52) U.S. Cl.
CPC ................ *G01G 3/1402* (2013.01); *G01G 3/08* (2013.01); *G01G 19/18* (2013.01); *G01L 1/2206* (2013.01)

(58) Field of Classification Search
CPC ........ G01L 1/044; G01L 1/2206; G01G 3/08; G01G 3/1402; G01G 19/18
See application file for complete search history.

(56) References Cited

U.S. PATENT DOCUMENTS

| | | | | |
|---|---|---|---|---|
| 3,151,693 | A | * | 10/1964 | Chapman ................. G01G 3/08 177/234 |
| 3,290,931 | A | | 12/1966 | Fowkes et al. |
| 3,754,438 | A | * | 8/1973 | Matson ................. G01L 1/2206 338/5 |
| 5,510,581 | A | | 4/1996 | Angel |
| 6,555,767 | B1 | | 4/2003 | Lockery et al. |

FOREIGN PATENT DOCUMENTS

GB          2475080        11/2011

\* cited by examiner

*Primary Examiner* — Randy W Gibson
(74) *Attorney, Agent, or Firm* — Volpe and Koenig, P.C.

(57) ABSTRACT

A hanging scale for measuring the weight of a hanging load comprises a first attachment section comprising a first bearing and a second attachment section comprising a second bearing, the first bearing and the second bearing being aligned along a vertical axis during operation of the hanging scale; at least one longitudinal deflection measurement section which has a first end and a second end, the deflection measurement section being located between the first bearing and the second bearing and being oriented transversely with respect to said vertical axis; a first connecting section which at least partially extends laterally from the first attachment section with respect to said vertical axis, the first connecting section connecting the first bearing to the first end of the deflection measurement section; and a second connecting section which at least partially extends laterally from the second attachment section with respect to said vertical axis, the second connecting section connecting the second bearing to the second end of the deflection measurement section.

17 Claims, 4 Drawing Sheets

HANGING SCALE HAVING A DEFLECTION MEASUREMENT SECTION ARRANGED TRANSVERSELY TO A VERTICAL AXIS

CROSS REFERENCE TO RELATED APPLICATION

This application claims benefit of European Patent Application No. 13187405.9 filed Oct. 4, 2013 which is incorporated by reference as if fully set forth.

FIELD OF INVENTION

The present invention relates to a hanging scale configured to measure the weight of a hanging load.

BACKGROUND

Hanging scales are used in a wide variety of applications, for example, in truck lifts. Hanging scales can also be used in patient lifts, which are used in hospitals or care facilities to assist in the lifting of patients. Such hanging scales generally are mounted between a carrier device, e.g. a frame including a boom, and the hanging load, e.g. a cradle to which a sling, a strap, a swing, or a vest used to transport the patient is attached. By installing the hanging scale between the boom and the cradle, the patient can be efficiently lifted and weighed using the same apparatus.

When the patient enters the sling or strap, the hanging scale expands in the vertical direction, and the patient's weight can be calculated by measuring the vertical deformation. Despite this increase in efficiency, the installation of the hanging scale at the patient lift takes up vertical space and decreases the maximum height or distance over which the patient can be lifted.

It is an object of the present invention to provide an improved hanging scale having a decreased overall height.

SUMMARY

This object is satisfied by a hanging scale in accordance with the present disclosure, which is configured to measure the weight of a hanging load and includes:

a first attachment section comprising a first bearing and a second attachment section comprising a second bearing, the first bearing and the second bearing being adapted to mount the hanging scale between a carrier device and the hanging load and being aligned along a vertical axis during operation of the hanging scale;

at least one longitudinal deflection measurement section which has a first end and a second end, the deflection measurement section being located between the first bearing and the second bearing and being oriented transversely with respect to said vertical axis;

a first connecting section which at least partially extends laterally from the first attachment section with respect to said vertical axis, the first connecting section connecting the first bearing to the first end of the deflection measurement section; and a second connecting section which at least partially extends laterally from the second attachment section with respect to said vertical axis, the second connecting section connecting the second bearing to the second end of the deflection measurement section.

In other words, the hanging scale is connected, for example, to a boom of a patient lift via the first bearing, and the load to be measured is connected to the second bearing of the second attachment section, for example, via a cradle. Said first and second bearings are aligned along the vertical axis of the hanging scale, in other words, in the direction of gravity. When the load is connected to the hanging scale, at least one deflection measurement section that is arranged between the first and second bearings deflects and causes the second bearing to move along the vertical axis, away from the first bearing.

The first end of said deflection measurement section is connected to the first bearing by way of the first connecting section and the first attachment section. Likewise, the second end of the deflection measurement section is connected to the second bearing by way of the second connecting section and the second attachment section.

As the deflection measurement section extends from the first connecting section to the second connecting section at least substantially transversely with respect to the vertical axis, and the first and second connecting sections themselves each extend at least partially in a lateral direction with respect to the vertical axis, the deflection measurement section is spaced laterally apart from the attachment sections, and can be configured to have a small height with respect to the vertical axis. Accordingly, the overall height of the hanging scale along the vertical axis can be reduced.

In a preferred embodiment, the hanging scale further comprises at least one strain gage mounted at the deflection measurement section, which is used to determine the extent of the deflection of the deflection measurement section caused by the hanging load. The strain gage has an axis of deformation sensitivity that can optionally be arranged such that it extends along or in parallel to a longitudinal axis of the deflection measurement section. In other words, at least one strain gage is arranged lengthwise at the deflection measurement, and therefore extends transversely to the vertical axis.

In particular, the hanging scale advantageously comprises at least one pair of strain gages having a first strain gage and a second strain gage, said first strain gage being mounted at or near the first end of the deflection measurement section and said second strain gage being mounted at or near the second end of the deflection measurement section. In this way, the strain gages are arranged at the areas of greatest deflection, resulting in a more accurate weight measurement.

It is possible to further increase the accuracy of the weight measurements according to another embodiment in which the hanging scale comprises two pairs of strain gages, one pair of strain gages being mounted at a top side of the deflection measurement section and the other pair of strain gages being mounted at a bottom side of the deflection measurement section. The two pairs of strain gages may optionally be connected to form a Wheatstone bridge circuit.

As an alternative to the use of strain gages, the hanging scale may comprise other types of deflection sensing devices. For example, the hanging scale may comprise at least one accelerometer, displacement transducer (e.g. LVDT or DCDT differential transformer) and/or optical sensor (e.g. photostress, laser) directly or indirectly connected to the deflection measurement section.

In an advantageous embodiment, said first connecting section of the hanging scale extends between the first attachment section and the first end of the (at least one) deflection measurement section both along said vertical axis (i.e. at least with a directional component parallel to or coaxially with said vertical axis) and in a lateral direction (i.e. at least with a transverse directional component with respect to said vertical axis), and also said second connecting section extends between the second attachment section and the second end of the (at least one) deflection measurement section both along said vertical axis and in a lateral direction. The respective lateral offset allows the first and second ends of the longitudinal deflection measurement section to be spaced laterally apart from the first and second attachment sections, i.e. spaced laterally apart from the first and second bearings aligned along the vertical axis. Additionally, the respective vertical offset allows the transversely oriented deflection measurement section (or plurality of deflection measurement sections) to be vertically located between the first and second attachment sections, i.e. between the first and second bearings.

In an embodiment, said first connecting section comprises at least a first limb portion that extends in a lateral direction with respect to said vertical axis (i.e. at least with a transverse directional component) and a first vertical offset portion that extends along said vertical axis (i.e. at least with a directional component parallel to or coaxially with said vertical axis), and said second connecting section comprises at least a second limb portion that extends in a lateral direction with respect to said vertical axis and a second vertical offset portion that extends along said vertical axis. The first and second limb portions allow the first and second ends of the longitudinal deflection measurement section to be spaced laterally apart from the first and second attachment sections, i.e. spaced laterally apart from the first and second bearings aligned along the vertical axis. The first and second vertical offset portions allow the transversely oriented deflection measurement section (or plurality of deflection measurement sections) to be vertically located between the first and second attachment sections, i.e. between the first and second bearings. The respective limb portion and vertical offset portion can be arranged in any order.

For example, and as explained in more detail below, the first connecting section may comprise a first limb portion extending from the first attachment section in a lateral direction and a first vertical offset portion extending from the first limb portion in a direction substantially parallel to the vertical axis, and the second connecting section may comprise a second vertical offset portion extending from the second attachment section in a direction substantially coaxially with the vertical axis and a second limb portion extending from the second vertical offset portion in a lateral direction, wherein the (at least one) deflection measurement section is connected between the first vertical offset portion and the second limb portion.

Alternatively, the first connecting section may for example comprise a first limb portion extending from the first attachment section in a lateral direction and a first vertical offset portion extending from the first limb portion in a direction substantially parallel to the vertical axis, and the second connecting section may comprise a second limb portion extending from the second attachment section in a lateral direction and a second vertical offset portion extending from the second limb portion in a direction substantially parallel to the vertical axis, wherein the (at least one) deflection measurement section is connected between the first vertical offset portion and the second vertical offset portion.

In a further embodiment, said deflection measurement section is centered symmetrically between the first bearing and the second bearing, achieving a well-balanced design that, for example, can reduce a pivoting or swinging of the hanging load. In other words, the deflection measurement section, in particular, the longitudinal axis of the deflection measurement section is arranged equidistant to the first and second bearings.

A balanced design is also realized according to a further embodiment in which the hanging scale comprises two longitudinal deflection measurement sections which extend parallel to one another and which are arranged symmetrically around said vertical axis. Said two deflection measurements can advantageously lie within in a plane, which is arranged between the first bearing and the second bearing and which is oriented transversely with respect to said vertical axis.

In a preferred embodiment, said first connecting section comprises a first limb portion that extends laterally from the first attachment section with respect to said vertical axis, a first vertical offset portion that extends from the first limb portion in a direction substantially parallel to said vertical axis, and first transverse portions that extend transversely from the first vertical offset portion in opposite directions. At the same time, said second connecting section comprises a second vertical offset portion that extends from the second attachment section substantially coaxially with said vertical axis, a second limb portion that extends laterally from the second vertical offset portion with respect to said vertical axis, and second transverse portions that extend transversely from the second limb portion in opposite directions. In this embodiment, said two deflection measurement sections extend between the first transverse portion and the second transverse portion.

According to a further embodiment that is particularly simple to manufacture, the hanging scale comprises a plate part having a U-shaped cutout such that the plate part is divided into the two deflection measurement sections, the first transverse portions, the second transverse portions and the second limb portion, wherein the second limb portion lies within the U-shaped cutout.

In a further, particularly compact, embodiment, the distance between the centers of the first and second bearings amounts to between 50% and 70% of a total height of the hanging scale along said vertical axis.

In a further embodiment, the hanging scale comprises an overload protection device adapted to limit the deflection of the deflection measurement section along a vertical direction during operation of the hanging scale. The overload protection device is mounted between a first securing portion directly or indirectly connected to the first bearing and a second securing portion directly or indirectly connected to the second bearing, and wherein the respective connection between the first securing portion and the first bearing and between the second securing portion and the second bearing has a higher mechanical stability than the deflection measurement section (or the plurality of deflection measurement sections, if there is more than one). In this way, the (at least one) deflection measurement section can deflect to the extent necessary to obtain a weight measurement, but is prevented from deflecting so far as to cause the mechanical failure of said deflection measurement section. Said securing portions may partially or fully be formed by said attachment sections and/or said connecting sections of the hanging scale.

In a particularly flexible embodiment, said overload protection device is adjustable with respect to the amount of limitation of the deflection of the deflection measurement section. In this way, the hanging scale may be adapted to the weight ranges of several applications. In a further embodiment in which said overload protection device comprises a screw having a threaded shaft and a screw head, wherein the threaded shaft of the screw is slidably held in a hole of one of the first and second securing portions and threadedly engaged in a threaded bore in the other of the first and second securing portions, said adjustment is simple in both handling and manufacture.

BRIEF DESCRIPTION OF THE DRAWINGS

The advantageous features are described in an exemplary manner only and are not intended to restrict the inventive apparatus in any way or form. The invention will be described in the following with regard to further features and advantages by way of examples with reference to the embodiment illustrated in the enclosed drawings. The Figures of the drawings show.

DETAILED DESCRIPTION

Figure 1:
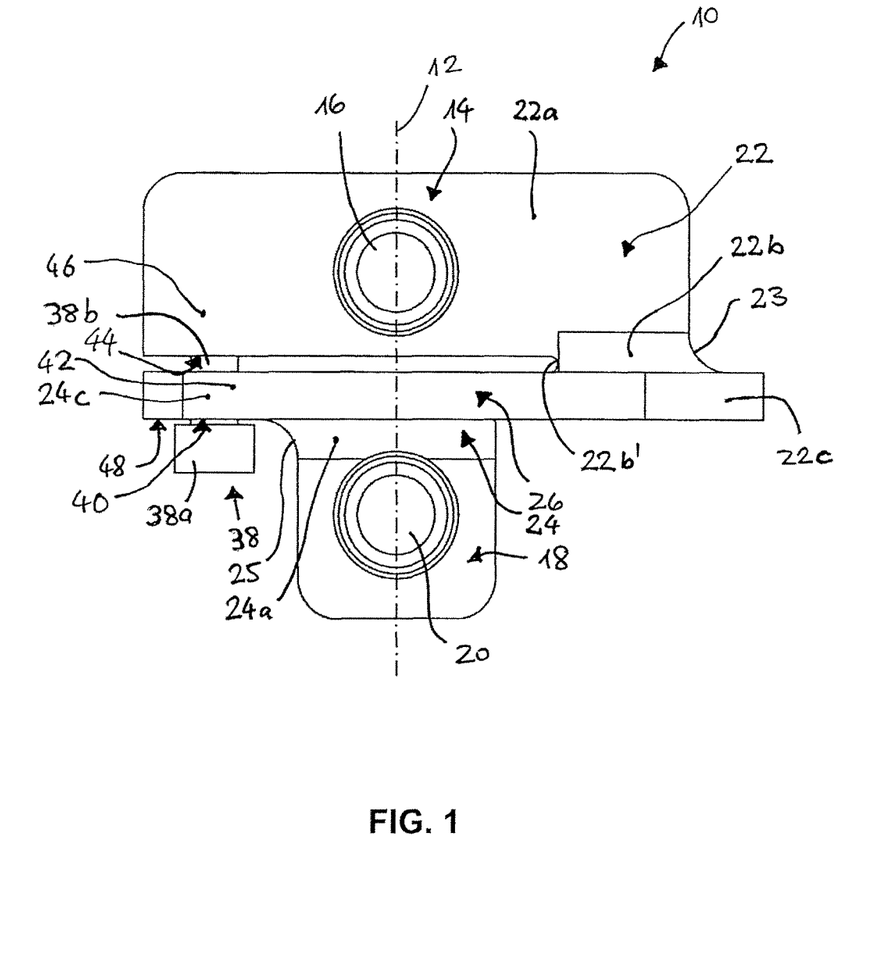
FIG. 1 a side view of an embodiment of the hanging scale in accordance with the invention.

FIG. 1 shows a hanging scale 10 configured to measure the weight of a load (not shown) along a vertical axis 12. The hanging scale 10 comprises a first attachment section 14 comprising a first bearing 16 configured for the connection of the hanging scale 10 to a carrier device, such as a boom of a patient lift (not shown). The hanging scale 10 further comprises a second attachment section 18 comprising a second bearing 20, at which the load to be measured can be connected.

The bearings 16, 20 are aligned along the vertical axis 12 and each comprise a horizontal axis, wherein said horizontal axes extend in parallel to one another and perpendicular to the vertical axis 12. Said bearings 16, 20 are configured as spherical bearings in the illustrated embodiment, but it is also conceivable to use other types of bearings, or even a different type of bearing for each of the bearings 16, 20.

With the exception of parts inserted in the bearings 16, 20 and with the exception of the overload protection device explained below, the hanging scale 10 is formed as a single rigid piece, i.e. without separate loose parts.

The first bearing 16 is arranged at the center of the first attachment section 14. At one end, a first connecting section 22 extends laterally from the first attachment section 14. The second bearing 20 is arranged at the center of the second attachment section 18. The second attachment section 18 is connected at its top side to a second connecting section 24. The centered arrangements of the bearings 16, 20 at the first and second attachment sections 14, 18 help balance and/or stabilize the hanging scale 10 during its use.

The designation of the attachment sections in this context is purely exemplary; it is, therefore, conceivable to attach the hanging scale 10 to the boom via the second bearing 20 of the second attachment section 18 and to hang the load at the first bearing 16 of the first attachment section.

In FIG. 1, a distance between the horizontal axes of the bearings 16, 20 comprises approximately 55% of the overall height of the hanging scale 10 along the vertical axis 12 and amounts, for example, to as little as 28 mm. Said distance represents the reduction in the maximum possible lift distance when the hanging scale 10 is installed, for example, at a patient lift. Given such dimensions, it is therefore possible to use the patient lift to weigh patients without experiencing a substantial decrease in the vertical distance the patient can be lifted.

The hanging scale 10 further comprises two deflection measurement sections 26, 26' (cf. FIGS. 2 and 4), which are configured to deflect in the direction of the vertical axis 12 when the load is applied to the hanging scale 10. As shown in FIG. 1, the deflection measurement section 26 is arranged between bearings 16, 12 and extends in a direction perpendicular to the vertical axis 12. The deflection measurement section 26 also comprises a height in the direction of the vertical axis 12 that amounts to less than about 10% of the overall height of the hanging scale 10, and contributes to the reduction of the total height of the hanging scale 10 in accordance with the invention. This compact design is also beneficial for truck lifts, as the enclosure size decreases, and the total cost is reduced.

Figure 2:
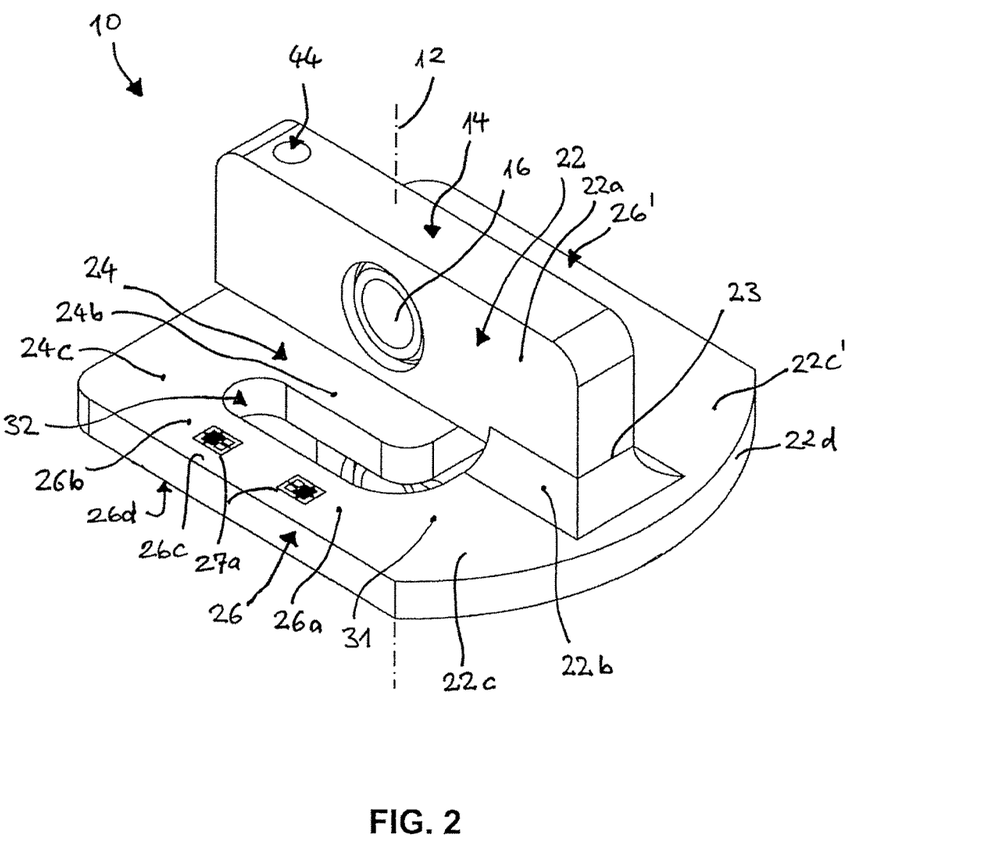
FIG. 2 a perspective view thereof.

FIG. 2 shows a perspective view of the hanging scale 10 from above. The first connecting section 22 is configured to connect the first attachment section 14, and thus the first bearing 16, to the deflection measurement sections 26, 26'. The first connecting section 22 comprises a first limb portion 22a, a first vertical offset portion 22b and first transverse portions 22c, 22c'. The first limb portion 22a extends laterally from the first attachment section 14 with respect to the vertical axis 12. The first vertical offset portion 22b extends from the first limb portion 22a in a direction parallel to the vertical axis 12, and it is formed by a projection in the manner of a cantilever beam. Said projection comprises a rounded inner corner 22b', which is configured to reduce the stress concentration within the first connecting section 22. The first transverse portions 22c, 22c' extend transversely from the first vertical offset portion 22b in opposite directions, and they are connected to the first vertical offset portion 22b, for example, by welding. This is shown in FIG. 2 by a welding seam 23, which extends around three edges of the first vertical offset portion 22b. The first transverse portions 22c, 22c' together comprise an optional lateral rounded edge 22d. Said transverse portions 22c, 22c' are each connected to one of the deflection measurement sections 26, 26'.

Figure 3:
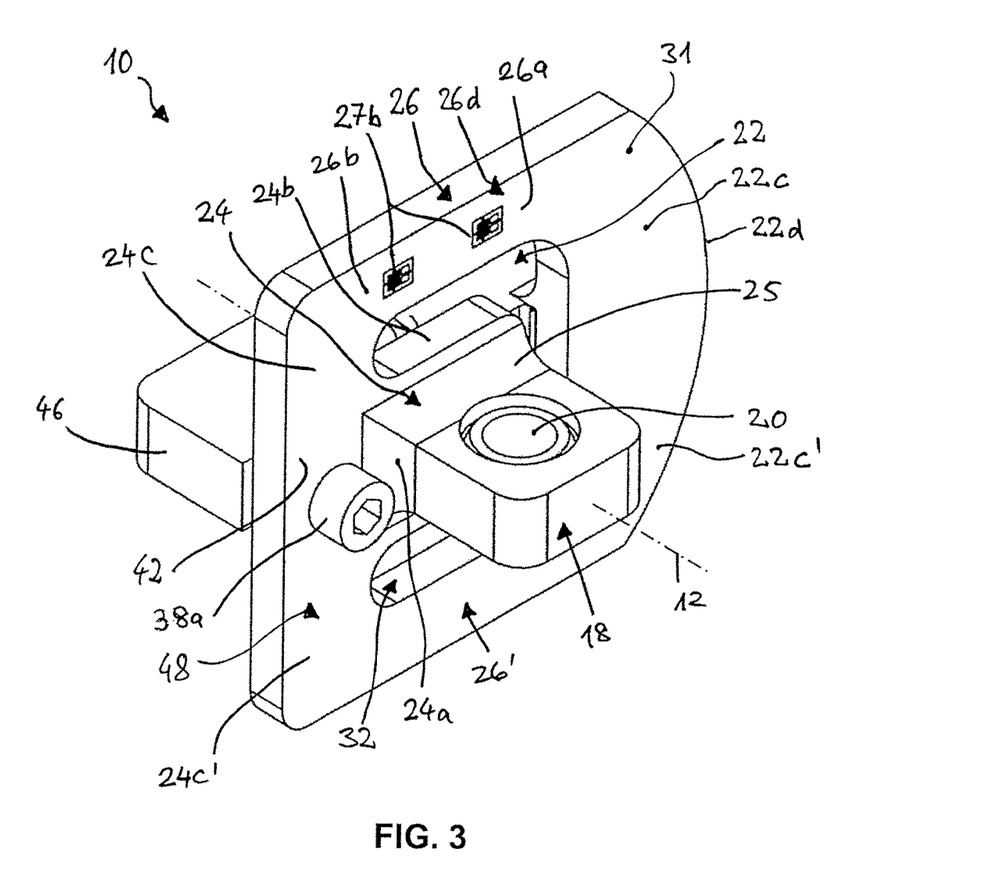
FIG. 3 a perspective view of the bottom side of the embodiment of FIGS. 1 and 2.

FIG. 3 shows a bottom perspective view of the second attachment section 18 and the second connecting section 24. The second connecting section 24 comprises a second vertical offset portion 24a, a second limb portion 24b and second transverse portions 24c, 24c'. The second vertical offset portion 24a extends from the second attachment section 18 coaxially with the vertical axis 12. The second limb portion 24b extends laterally from the second vertical offset portion 24a in a direction parallel to a line of symmetry 30 of the hanging scale 10 (cf. FIG. 4), i.e. in a horizontal direction. The second limb portion 24b is connected to the second vertical offset portion 24a by means of a welding seam 25, which extends along three sides of said second vertical offset portion 24a (cf. FIG. 4). Said second transverse portions 24c, 24c' extend transversely from the second limb portion 24b in opposite directions. Said transverse portions 24c, 24c' are configured to connect the second connecting section 24, and thus the second attachment section 18 and the bearing 20, to the deflection measurement sections 26, 26'.

Figure 4:
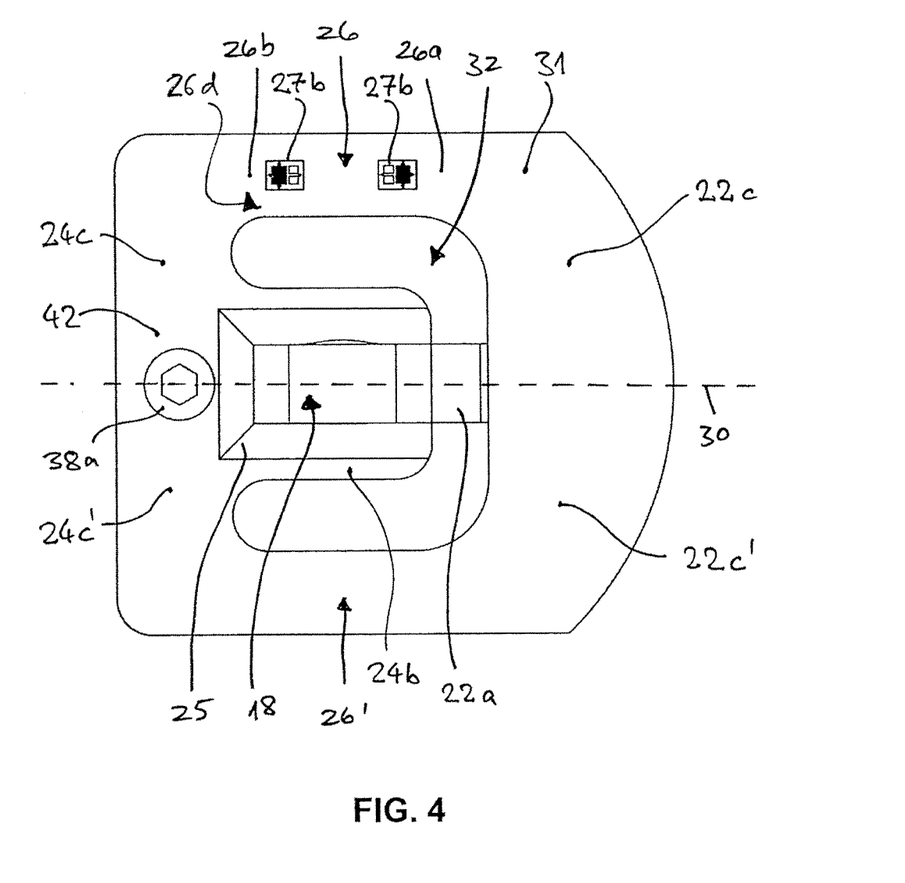
FIG. 4 a bottom view thereof.

FIG. 4 shows a bottom view of the hanging scale 10 which, in particular, illustrates the symmetry along the symmetry line 30. According to the illustrated embodiment, parts of the first and second connecting sections 22, 24 as well as the deflection measurement sections 26, 26' are formed as a single plate part 31, for example, made of metal and having a uniform thickness, which is arranged perpendicular to the vertical axis 12 between the first and second attachment sections 14, 18 (cf. FIG. 1).

Said plate part 31 is manufactured by providing a U-shaped cutout 32 arranged about the line of symmetry 30. Said cutout 32 divides the plate part 31 into the first and second transverse portions 22c, 22c', 24c, 24c', the second limb portion 24b and the deflection measurement sections 26, 26'. The plate part simplifies the manufacture and thus reduces the cost to produce the hanging scale 10.

In particular, the cutout 32 is flanked at either side by the deflection measurement sections 26, 26' extending in parallel to one another and symmetrically with respect to said line 30. The transverse portions 22c, 22c' and 24c, 24c' are arranged at opposite ends of the cutout 32, wherein the cutout 32 bounds the second limb portion 24*b* of the second connecting section 24. In other words, the second limb portion 24*b* is located partially within the cutout 32 and forms a tongue-like extension. Furthermore, the deflection measurement sections 26, 26' extend between the first transverse portions 22*c*, 22*c'* of the first connecting section 22 and the second transverse portions 24*c*, 24*c'* of the second connecting section 24.

For the sake of simplicity, the geometry of the deflection measurement sections 26, 26' is explained in the following in terms of the single deflection measurement section 26 as shown in FIG. 2. Due to symmetry, the explanation also applies to the other deflection measurement section 26' (cf. FIG. 4). As shown in FIG. 2, said deflection measurement section 26 comprises a rectangular cross-section and extends at a perpendicular angle to the vertical axis 12. The deflection measurement section 26 further comprises a first and a second end 26*a*, 26*b*, which are configured to connect the deflection measurement section 26 to the first and second connecting sections 22, 24, respectively. In particular, the first end 26*a* of the deflection measurement section 26 is connected to the first transverse portion 22*c* of the first connecting section 22, and the second end 26*b* is connected to the second transverse portion 24*c* of the second connecting section 24.

The deflection measurement sections 26, 26' comprise a thickness along the vertical axis 12, wherein the equal thicknesses of the first and second attachment sections 14, 18 amount to approximately 2 times the thickness of the deflection measurement sections 26, 26'. Said ratio, in other words, the fact that the attachment sections 14, 18 are substantially thicker than the deflection measurement sections 26, 26', ensures that during operation of the hanging scale 10, the deformation is restricted mainly to the deflection measurement sections 26, 26', which are configured to be the mechanically weakest part of the hanging scale 10, resulting in an accurate weight measurement.

In order to measure said deflection with respect to the vertical axis 12, the deflection measurement section 26 further comprises a top and a bottom side 26*c*, 26*d* and two pairs of strain gages 27*a*, 27*b* (cf. FIGS. 2, 3 and 4), wherein the first pair of strain gages 27*a* is mounted at the top side 26*c* of the deflection measurement section 26 (subject to tension), and wherein the second pair of strain gages 27*b* is mounted at the bottom side 26*d* of the deflection measurement section 26 (subject to compression).

Each strain gage 27*a*, 27*b* of the first pair and second pair comprises a longitudinal axis of deformation sensitivity extending coaxially with a longitudinal axis of the deflection measurement section 26, which corresponds to an axis of deflection of the deflection measurement section 26 during operation of the hanging scale 10. The strain gages 27*a*, 27*b* are mounted adjacent to the first and second ends 26*a*, 26*b* of the deflection measurement section 26 at which the magnitude of deflection during the operation of the hanging scale 10 is greatest.

It should be noted that FIGS. 2, 3 and 4 illustrate two pairs of strain gages 27*a*, 27*b*. However, the present invention is not restricted to the shown configuration of strain gages and, therefore, does not exclude an arrangement of strain gages mounted at both deflection measurement sections 26, 26', or using a lower number of strain gages.

When the load is placed on the hanging scale 10, the first attachment section 14 and the first bearing 16 remain at a fixed position along the vertical axis 12, whereas the second attachment section 18 and the second bearing 20 move downwardly depending on the load. Due to the thickness of the first limb portion 22*a* and the first vertical offset portion 22*b*, the first connecting section 22 also remains at a fixed vertical position. However, due to their thickness, the deflection measurement sections 26, 26' bend down, in other words, away from the first attachment section 14 with respect to the vertical axis 12.

Said bending and the resulting deflection is measured by the pairs of strain gages 27*a*, 27*b* by means of an electric circuit (not shown), and the weight of the load can be calculated.

In order to prevent a mechanical failure of the deflection measurement sections 26, 26', the hanging scale 10 further comprises an overload protection device formed by a screw 38, having a screw head 38*a* and a threaded shaft 38*b*. The threaded shaft 38*b* passes through an opening 40 provided at a second securing portion 42 of the second connecting section 24 and threadedly engages with a threaded bore hole 44 provided at a first securing portion 46 of the first connecting section 22 (cf. FIG. 1). The opening 40 at the second securing portion 42 is dimensioned so that said second securing portion 42 can slide in an axial direction along the threaded shaft 38*b*. In other words, the threaded shaft 38*b* does not threadedly engage with the opening 40 at the second connecting section 24.

Said threaded shaft 38*b* of said screw 38 is inserted into the threaded bore hole 44 with a gap remaining between a bottom side 48 of the second connecting section 24 and the screw head 38*a*. Said gap represents a maximum possible deflection of the deflection measurement sections 26, 26', and can be adjusted by tightening or loosening the screw 38. An alternative adjustable overload protection device may, for example, be conceivable in which a threaded bolt extends from above the first attachment section 14, through the bore hole 44 and the opening 40 at the second connecting section 24, and is secured below the bottom side 48 by means of a nut.

In the event that the load is greater than a predetermined maximum load, which is a load that could potentially cause a mechanical failure of the deflection measurement sections 26, 26', the deflection measurement sections 26, 26' deflect so far downwards, that the bottom surface 48 of the second connecting section 24 comes into contact with the screw head 38*a*. The engagement between the threaded shaft 38*b* and the threaded bore hole 44 of the first securing portion 46 has a greater resistance to stress in the direction of the vertical axis 12 than the deflection measurement sections 26, 26', and is therefore able to prevent any further vertical deflection of the deflection measurement sections 26, 26'. In this way, a mechanical failure of the deflection measurement sections 26, 26' and the subsequent overloading of the hanging scale 10 can be prevented.

LIST OF REFERENCE NUMERALS 10 hanging scale
12 vertical axis
14 first attachment section
16 first bearing
18 second attachment section
20 second bearing
22 first connecting section
22*a* first limb portion
22*b* first vertical offset portion
22*b'* rounded corner
22*c*, 22*c'* first transverse portions
22*d* lateral rounded edge
23 welding seam
24 second connecting section
24*a* second vertical offset portion 24b second limb portion
24c, 24c' second transverse portions
25 welding seam
26, 26' deflection measurement section
26a first end
26b second end
26c top side
26d bottom side
27a, 27b pair of strain gages
30 line of symmetry
31 plate part
32 cutout
38 screw
38a screw head
38b threaded shaft
40 opening
42 second securing portion
44 threaded bore hole
46 first securing portion
48 bottom side

What is claimed is:

1. A hanging scale for measuring the weight of a hanging load, comprising:
a first attachment section comprising a first bearing and a second attachment section comprising a second bearing, the first bearing and the second bearing being adapted to mount the hanging scale between a carrier device and the hanging load and being aligned along a vertical axis during operation of the hanging scale;
at least one longitudinal deflection measurement section which has a first end and a second end, the deflection measurement section being located between the first bearing and the second bearing and being oriented transversely with respect to said vertical axis;
a first connecting section which at least partially extends laterally from the first attachment section with respect to said vertical axis, the first connecting section connecting the first bearing to the first end of the deflection measurement section; and
a second connecting section which at least partially extends laterally from the second attachment section with respect to said vertical axis, the second connecting section connecting the second bearing to the second end of the deflection measurement section.

2. The hanging scale in accordance with claim 1, further comprising at least one strain gage mounted at the deflection measurement section.

3. The hanging scale in accordance with claim 2, wherein the strain gage has an axis of deformation sensitivity, wherein the strain gage is arranged such that the axis of deformation sensitivity extends coaxially with or in parallel to a longitudinal axis of the deflection measurement section.

4. The hanging scale in accordance with claim 1, comprising at least one pair of strain gages having a first strain gage and a second strain gage, the first strain gage being mounted at or near the first end of the deflection measurement section and the second strain gage being mounted at or near the second end of the deflection measurement section.

5. The hanging scale in accordance with claim 1, comprising two pairs of strain gages, one pair of strain gages being mounted at a top side of the deflection measurement section and the other pair of strain gages being mounted at a bottom side of the deflection measurement section.

6. The hanging scale in accordance with claim 1, wherein the first connecting section extends between the first attachment section and the first end of the deflection measurement section both along said vertical axis and in a lateral direction, and wherein said second connecting section extends between the second attachment section and the second end of the deflection measurement section both along said vertical axis and in a lateral direction.

7. The hanging scale in accordance with claim 1, wherein the first connecting section comprises at least a first limb portion that extends in a lateral direction with respect to said vertical axis and a first vertical offset portion that extends along said vertical axis; and
wherein the second connecting section comprises at least a second limb portion that extends in a lateral direction with respect to said vertical axis and a second vertical offset portion that extends along said vertical axis.

8. The hanging scale in accordance with claim 1, wherein the deflection measurement section extends substantially perpendicularly to said vertical axis;
and/or wherein the deflection measurement section is centered symmetrically between the first bearing and the second bearing.

9. The hanging scale in accordance with claim 1, comprising two longitudinal deflection measurement sections which extend parallel to one another and which are arranged symmetrically around said vertical axis.

10. The hanging scale in accordance with claim 9, wherein the first connecting section comprises a first limb portion that extends laterally from the first attachment section with respect to said vertical axis, a first vertical offset portion that extends from the first limb portion in a direction substantially parallel to said vertical axis, and first transverse portions that extend transversely from the first vertical offset portion in opposite directions;
wherein the second connecting section comprises a second vertical offset portion that extends from the second attachment section substantially coaxially with said vertical axis, a second limb portion that extends laterally from the second vertical offset portion with respect to said vertical axis, and second transverse portions that extend transversely from the second limb portion in opposite directions; and
wherein the two deflection measurement sections extend between the first transverse portions and the second transverse portions.

11. The hanging scale in accordance with claim 10, wherein the hanging scale comprises a plate part having a U-shaped cutout such that the plate part is divided into the two deflection measurement sections, the first transverse portions, the second transverse portions and the second limb portion, the second limb portion lying within the U-shaped cutout.

12. The hanging scale in accordance with claim 1, wherein the distance between the centers of the first and second bearings amounts to between 50% and 70% of a total height of the hanging scale along said vertical axis.

13. The hanging scale in accordance with claim 1, further comprising an overload protection device adapted to limit a deflection of the deflection measurement section along a vertical direction during operation of the hanging scale, wherein the overload protection device is mounted between a first securing portion connected to the first bearing and a second securing portion connected to the second bearing, and wherein the respective connection between the first securing portion and the first bearing and between the second securing portion and the second bearing has a higher mechanical stability than the at least one deflection measurement section.

14. The hanging scale in accordance with claim 13, wherein the overload protection device is adjustable with respect to the amount of limitation of the deflection of the deflection measurement section.

15. The hanging scale in accordance with claim 13, wherein the overload protection device comprises a screw having a threaded shaft and a screw head, wherein the threaded shaft of the screw is slidably held in an opening of one of the first and second securing portions and engaged in a threaded bore hole in the other of the first and second securing portions.

16. The hanging scale in accordance with claim 8, wherein the deflection measurement section is centered symmetrically between the first bearing and the second bearing.

17. The hanging scale in accordance with claim 1, wherein the deflection measurement section is centered symmetrically between the first bearing and the second bearing.

* * * * *